Patented June 24, 1930

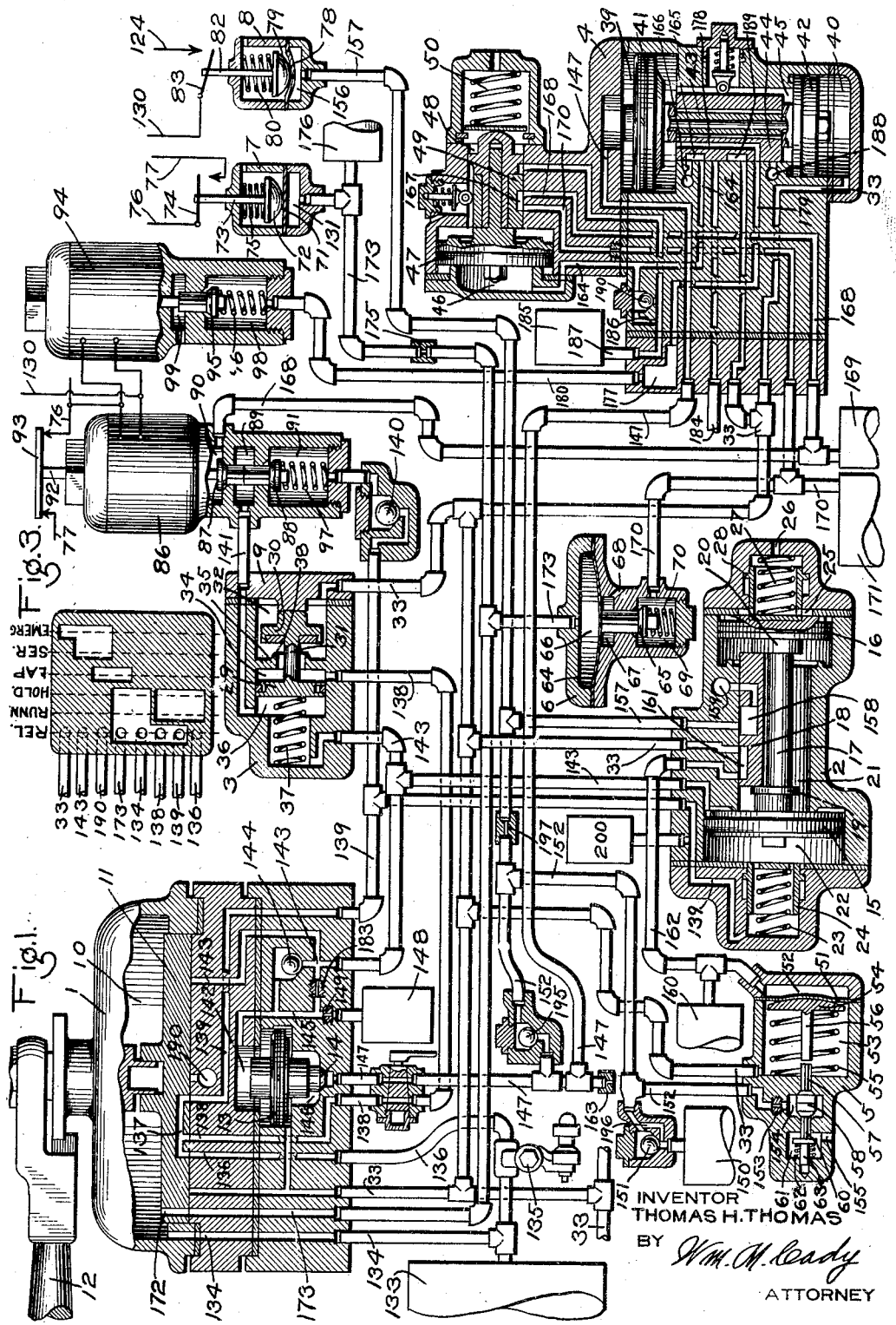

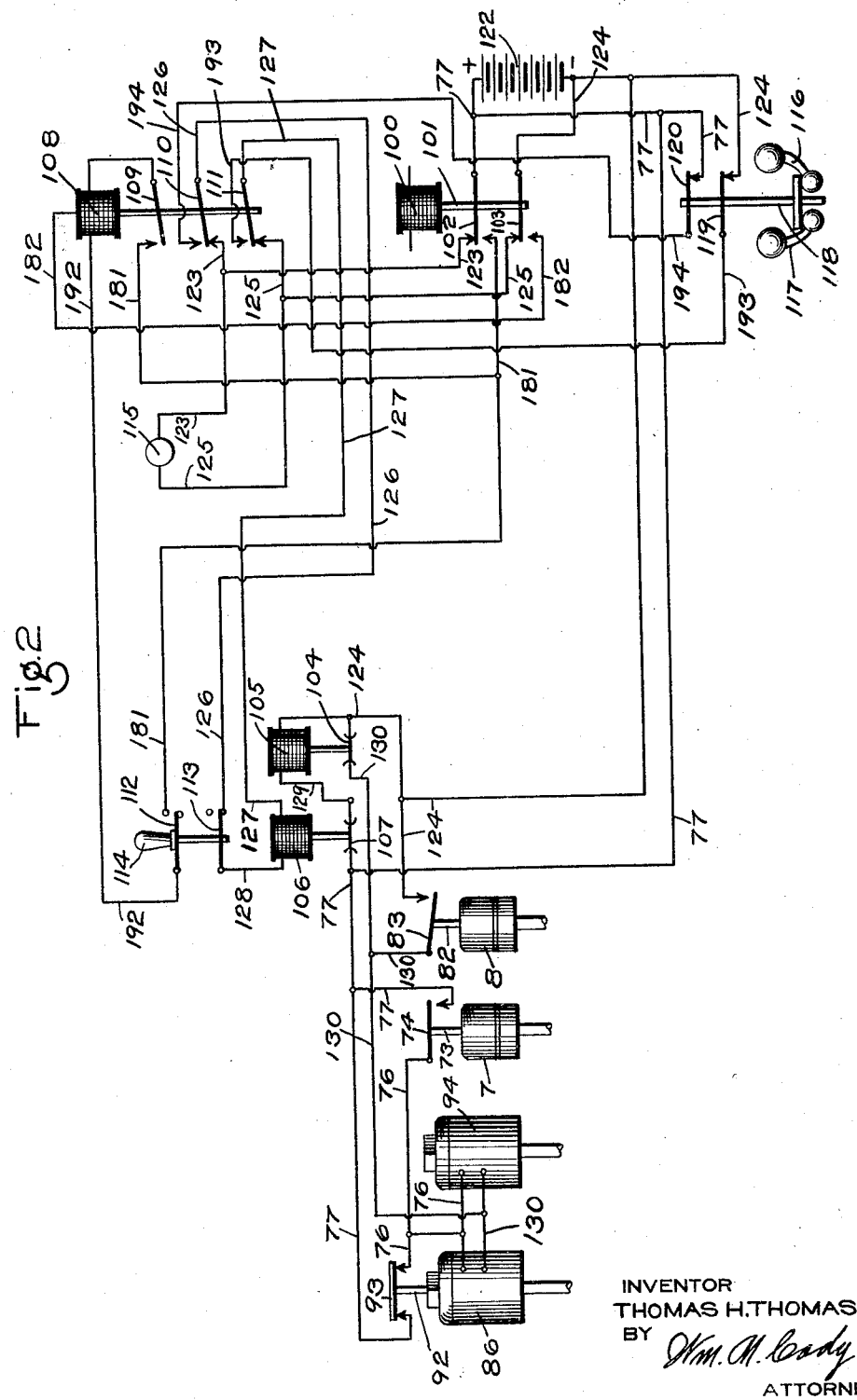

1,765,509

UNITED STATES PATENT OFFICE

THOMAS H. THOMAS, OF EDGEWOOD, PENNSYLVANIA, ASSIGNOR TO THE WESTINGHOUSE AIR BRAKE COMPANY, OF WILMERDING, PENNSYLVANIA, A CORPORATION OF PENNSYLVANIA

AUTOMATIC TRAIN-CONTROL EQUIPMENT

Application filed September 17, 1928. Serial No. 306,511.

This invention relates to train control apparatus and in particular to the type employing fluid pressure apparatus adapted to be electrically controlled from the trackway.

One object of my invention is to provide an improved train control apparatus of the above type.

Another object of my invention is to provide a train control apparatus of the above type which is simple in construction, but which embodies all the characteristics necessary to a complete and safely operative train control mechanism.

Other objects and advantages will appear in the following more detailed description of the invention.

In the accompanying drawing: Figure 1 is a diagrammatic sectional view of the pneumatic portion of the apparatus for controlling the operation of the brakes; Fig. 2 is a wiring diagram of the electrical portion of the apparatus, which is adapted to operate in accordance with the track condition for controlling the operation of the pneumatic portion of the apparatus shown in Fig. 1; and Fig. 3 is a diagrammatic development of the brake valve device shown in Fig. 1.

As shown in Fig. 1 of the drawing, the pneumatic portion of the apparatus comprises a brake valve device 1, a repeater valve device 2, a cut-off valve device 3, a split reduction valve device 4, a reduction insuring valve device 5, a reduction limiting valve device 6, a reset switch device 7, a suppression switch device 8, and two magnet valve devices.

The brake valve device is of the usual well known type employed for manually controlling the brakes and comprises a casing having a chamber 10 containing a rotary valve 11 adapted to be operated by a handle 12. Said casing also contains the usual equalizing valve mechanism comprising an equalizing piston 13 and a brake pipe discharge valve 14 adapted to be operated by said piston.

The repeater valve device 2 is adapted to operate in accordance with the position of the brake valve rotary valve 11 and comprises two pistons 15 and 16 operatively connected together by a stem 17, and a slide valve 18 mounted between two collars 19 and 20 formed on the stem 17, and adapted to be operated by said pistons.

The repeater valve piston 15, which is of greater area than the piston 16, has a chamber 22 at its outer face, which chamber contains a spring 23 so controlled by a sleeve-like member 24 as to resist extreme outward movement of the piston 15. The piston 16 has a chamber 25 at its outer face, which is permanently connected to the atmosphere through a passage 26, said chamber containing a spring 27, which is so controlled by a sleeve-like member 28 as to resist extreme outward movement of the piston 16. Intermediate said pistons and containing the slide valve 18 is a valve chamber 21.

The cut-off valve device 3 comprises a piston 29 and a poppet valve 30 operatively connected to said piston by a stem 31. Said poppet valve is contained in a chamber 32, the outer end of which is closed by a cover plate 9 through which communication is established from said chamber to the brake pipe 33. The piston 29 has at one side a chamber 34, which is separated from chamber 32 by an apertured partition wall 35, the piston stem 31 extending through the aperture in said partition wall. Said piston has at the outer face a chamber 36 containing a spring 37 acting thereon and tending to maintain the poppet valve 30 away from a seat ring 38 surrounding the aperture in partition wall 35.

The split or two stage reduction valve device is substantially the same as disclosed in Patent No. 1,663,736 of T. H. Thomas, et al., and comprises a casing having differential piston chambers 39 and 40 containing control pistons 41 and 42 respectively, said pistons being connected by a stem 43 and being adapted to operate a slide valve 44 contained in the intermediate valve chamber 45.

The split reduction valve casing is also provided with a piston chamber 46 containing a piston 47 and a valve chamber 48 containing a slide valve 49 adapted to be operated by said piston. A spring 50 in chamber 48 opposes inward movement of the piston 47.

The reduction insuring valve device 5 comprises a casing containing a flexible diaphragm 51 having a chamber 52 at one side and a chamber 53 at the opposite side. A follower 54 is contained in chamber 53 and is held in engagement with said diaphragm by the pressure of a spring 55, said follower having a projecting stem 56 adapted to engage the fluted stem 57 of a double beat valve 58, contained in a chamber 154, for operating said valve. Said valve also has a fluted stem 60 extending into a chamber 61, wherein a spring 62 acting on a collared stem 63, opposes the action of the diaphragm 51.

The reduction limiting valve device 6 comprises a diaphragm 64 and a valve 65 adapted to be operated by said diaphragm. The diaphragm 64 has at one side a chamber 66 and at the opposite side a chamber 67 which is connected to the atmosphere through a passage 68. The valve 65 is contained in a chamber 69 and has a fluted stem extending upwardly into chamber 67, therein engaging the diaphragm 64. A spring 70 in chamber 69 tends to seat said valve.

The reset switch device 7 comprises a diaphragm 71 and a follower 72 adapted to be operated upon deflection of said diaphragm. Said follower has a stem 73 operatively carrying at its outer end a switch arm 74. A spring 75 acting on said follower tends to cause said switch arm to connect wires 76 and 77.

The suppression switch device 8 comprises a diaphragm 78 and a follower 79 operated by deflection of said diaphragm, a spring 80 being adapted to oppose such operation. The follower 79 has an upwardly projecting stem 82 for operating a switch arm 83 mounted at the outer end thereof.

The application magnet valve device comprises a magnet 86 adapted to operate two valves 87 and 88 against the pressure of a spring 97, the valve 87 being adapted to control communication from a chamber 89 to a chamber 90 and the valve 88 being adapted to control communication between chambers 89 and 91. Carried by an upwardly extending portion 92 of the magnet armature stem (not shown) is a switch contact member 93 for controlling a circuit through wires 76 and 77.

Operatively connected in parallel with the magnet 86 of the application magnet valve device is a magnet 94 of a lock-up reservoir release magnet valve device. Said magnet is adapted to operate a valve 95 against the pressure of a spring 96 for controlling communication between chamber 98 and an atmospheric chamber 99.

For the purpose of controlling the operation of the application magnet 86 and the magnet 94 in accordance with the track conditions, I provide a decoding relay magnet device comprising a magnet 100 having a depending stem 101 operatively carrying two switch arms 102 and 103.

Interposed in the electric circuit between the decoding relay magnet device and the application magnet 86 and the magnet 94 is a switch 104 adapted to be controlled by the operation of two slow acting magnets 105 and 106 and a switch 107. The circuit through the slow acting magnet 106 is interlocked through an acknowledging relay magnet device comprising a magnet 108 for operating three switch arms 109, 110 and 111, and a manually operative acknowledging switch device comprising two switch arms 112 and 113 adapted to be operated by a handle 114.

For the purpose of visibly indicating the track condition to the engineer, I provide a cab light 115 controlled by the switch arms 102 and 103 of the decoding relay device.

In order to prevent a train exceeding a predetermined speed limit, a speed governor of the centrifugal type is employed, said governor comprising weighted arms 116 and 117 adapted to be rotated at a speed proportional to the train speed for operating a stem 118 carrying at its upper end two switch arms 119 and 120.

In operation, when the track conditions are favorable, the decoding relay magnet 100 is energized by electrical apparatus (not shown), which operates by induced current produced in accordance with current flowing through the track rails.

Energization of the decoding relay magnet 100 lifts the contacts 102 and 103 to the position shown in the drawing, in which the positive terminal of a battery 122 is connected through wire 77 to a wire 123, and the negative terminal of said battery is connected through wire 124 to a wire 125, said wires 123 and 125 leading to the acknowledging relay switch device and to the cab signal light 115, said cab signal light thereby being lighted so as to disclose to the engineer the favorable track condition.

When the decoding relay magnet 100 is energized, the acknowledging relay magnet 108 is deenergized, due to the acknowledging relay switch arm 109 and the manually operative acknowledging switch arm 112 being in the positions shown in the drawing, in which no circuit can be closed through said magnet 108.

With the acknowledging relay magnet 108 thus deenergized, the switch arms 109, 110 and 111 are dropped to the position shown in the drawing, in which position wires 123 and 125 from the decoding relay switch arms 102 and 103 and the battery 122, are connected through switch arms 110 and 111 to wire 126 leading to the manually operative acknowledging switch arm 113, and to wire 127 leading to the slow acting magnet 106.

Normally, the acknowledging switch arms 112 and 113 are in the position shown in the drawing, so that switch arm 113 connects wire 126 to wire 128 leading to the slow acting magnet 106. A circuit is thus closed through said slow acting magnet, which becomes energized and causes the switch 107 to move and connect wire 77 from the positive pole of the battery 122 to wire 129 leading to the slow acting magnet 105. The other terminal of said magnet 105 is connected to wire 124 from the negative pole of battery 122, so that a circuit is closed through said magnet, which becomes energized and shifts switch 104, so as to connect wire 124 from the negative pole of battery 122 to wire 130 leading to the application magnet 86 and the magnet 94.

With the brake valve device in running position as shown in the drawing, and with the brake system uncharged, the reset diaphragm chamber 131 is at atmospheric pressure, so that the spring 75 is permitted to hold the follower 72 in the downward position and cause switch 74 to connect wire 76 to wire 77 from the positive pole of battery 122. Wire 76 is connected to the application magnet 86 and the magnet 94 and since said magnets are normally connected to the negative pole of battery 122 through wire 130 and switch 104 of the slow acting magnet 105, a circuit is closed through said magnets thereby energizing same, causing the application magnet switch 93 to move down and connect wires 76 and 77, so as to close a circuit through said magnets, independently of the circuit through the reset switch arm 74, for reasons to be hereinafter described.

When the application magnet 86 is energized, as under favorable track conditions, it operates to seat valve 87 and unseat valve 88 against the pressure of spring 97, and the magnet 94 operates to unseat the valve 95 against the pressure of spring 96.

With the main reservoir 133 charged in the usual manner, fluid under pressure flows therefrom through pipe and passage 134 to the rotary valve chamber 10 of the brake valve device and through said pipe to a feed valve device 135, which reduces the pressure of the fluid from that carried in the main reservoir to that normally carried in the brake pipe 33. Fluid at said reduced pressure then flows from the feed valve device 135 to the seat of the rotary valve 11 of the brake valve device by way of pipe and passage 136.

With the rotary valve 11 turned to the usual running position by the handle 12, fluid at feed valve pressure flows from passage 136 through cavity 137 in the rotary valve and passage and pipe 138 to the piston chamber 34 of the cut-off valve device 3 and also from said cavity 137 to the cut-off valve piston chamber 36 by way of passage and pipe 139, past the ball check valve 140, through valve chamber 91 in the application magnet valve device, past the normally unseated valve 88, through chamber 89 and from thence through pipe and passage 141. The fluid pressures thereby become equal on the opposite sides of the cut-off valve piston 29, which permits spring 37 to shift said piston inwardly, thereby unseating the cut-off valve 30, which permits fluid under pressure to flow from chamber 34 to chamber 32 and from thence to the brake pipe 33 and charge said brake pipe.

Fluid at feed valve presure flows from the cut-off valve piston chamber 36 to the equalizing piston chamber 142 through pipe and passage 143, past a ball check valve 144 and through passage 145, thereby causing the equalizing piston 13 to seat the brake pipe discharge valve 14, so as to prevent flow of fluid under pressure from chamber 146, which is connected to the brake pipe 33, past said discharge valve and to the atmosphere through passage and pipe 147 and the choked atmospheric opening 163.

At the same time as the equalizing piston chamber 142 is charged, fluid under pressure flows from passage 145 to an equalizing reservoir 148 through a choke plug 149, thereby charging said reservoir at a restricted rate.

The repeater valve piston chamber 22 is charged with fluid at feed valve pressure through passage and pipe 139 at the same time as fluid under pressure is supplied to the cut-off valve piston chamber 36, and the repeater slide valve chamber 21 is charged with fluid at feed valve pressure through passage and pipe 143 from said cut-off valve piston chamber. The fluid pressures therefore become equalized on the opposite sides of the repeater valve piston 15, and since the repeater valve piston chamber 25 is permanently vented to the atmosphere, the fluid pressure in valve chamber 21, acting on the piston 16, shifts the pistons 15 and 16 and the slide valve 18 to their extreme right or running position, in which position spring 27 is compressed by the engagement of sleeve 28 by piston 16.

With the repeater valve pistons and slide valve 18 in running position, as just described, fluid under pressure is permitted to flow from the brake pipe 33 to the diaphragm chamber 52 of the reduction insuring valve device 5 and to a suppression reservoir 160 through cavity 161 in the repeater valve slide valve 18 and passage and pipe 162. The chamber 53 at the opposite side of diaphragm 51, being in constant communication with the brake pipe 33, is also charged with brake pipe pressure, so that spring 55, acting on diaphragm follower 54, holds said follower in the position shown in the drawing, in which the double beat valve 58 is seated to the right, thereby connecting a timing reservoir 150 with the atmosphere past a ball check valve 151, through passage and pipe 152, through a choke plug 153 in the reduction insuring valve device 5, valve chamber 154, past the fluted stem 60 of double beat valve 58 and from thence through the atmospheric passage 155.

With the repeater slide valve 18 in the running position, the suppression switch diaphragm chamber 156, which is connected to the timing reservoir 150 through pipe 157, choked connection 197 and pipe 152, is connected with the atmosphere through pipe and passage 157, cavity 158 in the repeater slide valve 18 and the atmospheric passage 159, thereby permitting spring 80 to normally hold the follower 79 in the downward position, in which the switch arm 83 disconnects wires 130 and 124.

With the brake valve in running position and the discharge valve 14 seated, the split reduction piston chamber 39 is at atmospheric pressure due to the connection through passage and pipe 147 with the atmospheric choked opening 163. The piston chamber 40 of the split reduction device is in constant communication with the brake pipe 33, so that fluid at brake pipe pressure acting therein on piston 42 normally holds said piston, the piston 41 and slide valve 44 in the position shown in the drawing, in which the hold back piston chamber 46 is connected to the atmosphere through passage 164, cavity 165 in the slide valve 44 and the atmospheric passage 166. The spring 50 is thereby permitted to hold the hold back piston 47 and slide valve 49 in the position shown in the drawing, in which a cavity 167 in said slide valve connects a passage 168 from a first reduction reservoir 169 to a passage 170 from a second reduction reservoir 171.

With a brake valve device in running position, a port 172 in the rotary valve 11 registers with a passage 173 and fluid under pressure flows from the rotary valve chamber 10 through said passage and the pipe 173 to the diaphragm chamber 66 of the limiting valve device 6, and acts upon diaphragm 64, deflecting said diaphragm downwardly and unseating the limiting valve 65 against the pressure of spring 70.

With the limiting valve 65 unseated, the second reduction reservoir 171, and consequently the first reduction reservoir 169 which is connected to the second reduction reservoir, is connected to the atmosphere through pipe and passage 170, past the unseated limiting valve 65, through chamber 67 and through the atmospheric passage 68.

At the same time as the limiting valve diaphragm chamber 66 is charged, fluid under pressure flows through pipe 173 and a choked connection 175 to diaphragm chamber 131 of the reset switch device 7 and to a reset reservoir 176. The pressure of fluid in said diaphragm chamber acts on diaphragm 71 to shift the follower 72 upwardly against spring 75 and causes switch arm 74 to normally disconnect wires 76 and 77.

With the split reduction device 4 in the normal position, as shown in the drawing, the control valve chamber 45 is connected to a lock-up reservoir volume 177 through port 178 in the control slide valve 44 and passage 179, and said reservoir volume is normally vented to the atmosphere through pipe and passage 180, magnet valve chamber 98 and the atmospheric chamber 99, due to the magnet valve 95 being unseated by the energized magnet 94.

If the track conditions become unfavorable, the decoding relay magnet 100 is deenergized and permits the switch arms 102 and 103 to drop and open the circuit through wires 123 and 125 and connect with wires 181 and 182.

Opening of the circuit through wires 123 and 125 causes the cab signal light 115 to go out, so as to indicate to the engineer the unfavorable track condition, and also cuts off the current supply to the slow acting magnet 106, through wires 123 and 125, the acknowledging relay switch arms 110 and 11 and wires 126 and 127.

A predetermined period of time after thus cutting off the current supply to magnet 106, said magnet becomes deenergized and operates to shift switch 107 so as to disconnect wire 77 from the positive terminal of battery 122, from wire 129 leading to the slow acting magnet 105, thereby opening the circuit through said magnet 105. Then after a predetermined period of time, the magnet 105 becomes deenergized and shifts switch 104 so as to break the circuit through the application magnet 86 and magnet 94, which circuit is normally closed through wire 124 from the negative pole of battery 122, magnet switch 104, wire 130, thence through said magnet, wire 76, application magnet switch 93, and wire 77 from the positive pole of said battery.

The application magnet 86 and the magnet 94 thereby become deenergized, so that the pressure of spring 97 in the application magnet valve device operates to seat valve 88 and unseat valve 87, while the pressure of spring 96 in the other magnet valve device operates to seat valve 95, so as to close communication between valve chamber 98 and the atmospheric chamber 99.

Unseating of the application magnet valve 87 permits fluid under pressure to quickly flow from the cut-off valve piston chamber 36 to the first reduction reservoir 169, through passage and pipe 141, chambers 89 and 90 in the application magnet valve device and pipe 168.

The quick venting of fluid under pressure from the cut-off valve piston chamber 36 permits the pressure of fluid in the cut-off valve piston chamber 34 to shift the piston 29 outwardly against spring 37 and thus seat valve 30 against the seat ring 38, so as to prevent further flow of fluid under pressure from piston chamber 34 to valve chamber 32 and from thence to brake pipe 33.

As the fluid under pressure is quickly vented from the cut-off valve piston chamber 36, the fluid under pressure is gradually vented from the equalizing piston chamber 142 and equalizing reservoir 148 to the first reduction reservoir 169, through pipe and passage 145, choke plug 183, passage and pipe 143 and through said cut-off valve piston chamber. The brake pipe pressure in the equalizing piston chamber 146 then shifts the equalizing piston 13 upwardly, which opens the brake pipe discharge valve 14 and permits fluid under pressure to flow from the brake pipe 33 to pipe and passage 147 and from thence to the atmosphere through the choked opening 163, thereby effecting a brake pipe reduction in order to apply the brakes in the usual manner.

Since the choked atmospheric opening 163 restricts the rate of flow of fluid under pressure from pipe 147, the pressure in said pipe becomes substantially equal to brake pipe pressure, and pipe 147 being connected to the control piston chamber 39 of the split reduction device, the pressure in said pipe becomes effective upon the control piston 41, which operates to shift the slide valve 44 downwardly against the brake pipe pressure in chamber 40 acting on the smaller piston 42.

In the downward position of the control pistons 41 and 42 and slide valve 44, fluid at a predetermined pressure is supplied by a feed valve device (not shown) to the hold back piston chamber 46 through pipe and passage 184, cavity 165 in the control slide valve 44, and passage 164, and causes the hold back piston 47 and slide valve 49 to move to their inner position against the pressure of spring 50, in which position passages 168 and 170, from the first and second reduction reservoirs 169 and 171 respectively, are disconnected from each other. The degree of reduction in pressure of the fluid in the equalizing reservoir 148 is thereby limited to equalization into the first reduction reservoir.

At the same time as the hold back piston chamber 46 is charged, a timing reservoir 185 is charged at a restricted rate by the flow of fluid under pressure from passage 164 through a choked opening 186 and passage and pipe 187.

With the control pistons 41 and 42 and slide valve 44 in the downward position, the control valve chamber 45 is vented to the atmosphere through port 178 in said slide valve and the atmospheric passage 188, and fluid under pressure is supplied to the lock-up reservoir volume 177 from the brake pipe 33 through cavity 189 in said slide and passage 179.

After the brake pipe pressure, effective in the equalizing piston chamber 146, is reduced to or slightly less than the pressure in the equalizing reservoir, effective in the equalizing piston chamber 142, the equalizing piston is shifted downwardly and seats the discharge valve 14. The fluid under pressure is then vented to the atmosphere from the pipe and passage 147 and control piston chamber 39, through the choked opening 163, which venting permits the control pistons 41 and 42 and slide valve 44 to be shifted back to their upper position by the brake pipe pressure in piston chamber 40.

In the upper position of the control slide valve, the fluid under pressure in the hold back piston chamber 46 and the timing reservoir 185, which is connected back to said piston chamber through pipe and passage 187, past a ball check valve 190 and passage 164, is permitted to flow to the atmosphere through passage 164, cavity 165 in the control slide valve 44 and the restricted atmospheric passage 166, and when the pressure of said fluid is thus reduced a predetermined degree, spring 50 shifts the hold back piston 47 and slide valve 49 to their outwardly position, in which position cavity 167 in said slide valve connects passages 168 and 170 from the first and second reduction reservoirs 169 and 171 respectively.

With the first and second reduction reservoirs thus connected, fluid under pressure from the equalizing reservoir 148 and first reduction reservoir 169 flows to the second reduction reservoir 171, thereby causing a second stage of reduction in equalizing reservoir pressure to be effected.

The second stage of reduction in equalizing reservoir pressure causes the equalizing piston 13 to again operate the discharge valve 14 to permit a corresponding second reduction in brake pipe pressure.

Fluid under pressure vented from the brake pipe to pipe 147 during the second stage of reduction does not operate the control portion of the split reduction device as during the initial stage of reduction, since when the control slide valve 44 moves back to its upper position, fluid under pressure from the charged lock up reservoir volume 177 flows back to the control slide valve chamber 45, through passage 179 and port 178 in slide valve 44 and therein acts upwardly on piston 41 to offset the downward pressure of brake pipe fluid supplied to piston chamber 39.

If the brake valve device 1 is left in running position when a brake application is automatically effected in the manner hereinbefore described, then a complete venting of fluid under pressure from the brake pipe 33 will occur, since the second reduction reservoir 171 is connected to the atmosphere past the limiting valve 65, which is unseated by fluid under pressure supplied by said brake valve device to the limiting valve diaphragm chamber 66 through port 172 in rotary valve 11 and passage and pipe 173.

In order to limit the degree of brake pipe reduction to that required for fully applying the brakes in service, the brake valve handle 12 is operated upon the initiation of the brake application, to turn the rotary valve 11 to lap position, in which the limiting valve diaphragm chamber 66 is vented to the atmosphere through passage and pipe 173, a cavity (not shown) in the rotary valve 11 and the atmospheric passage 190. Spring 70 is thereby permitted to seat valve 65 and close the atmospheric connection from the second reduction reservoir 171. The degree of reduction in equalizing reservoir pressure, and consequently in brake pipe pressure, is thereby limited to the equalization of pressures in the equalizing reservoir 148 and the first and second reduction reservoirs 169 and 171, respectively.

After a brake application is automatically effected in the manner hereinbefore described, if the track conditions become favorable, the decoding relay magnet 100 is again energized and operates switch arms 102 and 103 so as to again close the circuit through the slow acting magnet 106. The magnet 106 then operates the switch 107 to close the circuit through the magnet 105, which then operates the switch 104 to connect wire 124 from the negative pole of battery 122 to wire 130 leading to the application magnet 86 and the magnet 94.

When the track conditions become favorable, then an application of the brakes, effected in the manner hereinbefore described, may be released by operating the brake valve handle 12, so as to turn the rotary valve 11 to lap position, in which the reset switch diaphragm chamber 131 and reservoir 176 are vented to the atmosphere through pipe 173, containing the choked connection 175, a cavity (not shown) in the rotary valve 11 and the atmospheric passage 190. The fluid under pressure being thus vented from the diaphragm chamber 131, spring 75 causes the switch arm 74 to be moved downwardly and connect wire 77 from the positive pole of battery 122 to wire 76 leading to the application magnet 86 and magnet 94, and since the negative pole of said battery is also connected to said magnets through wire 130, said magnets become energized, the application magnet 86 operating switch 93 to connect wires 76 and 77 independently of the connection through the reset switch arm 74, so that the reset switch arm 74 may then be shifted away from wire 77 without the deenergization of the application magnet 86 and magnet 94.

After the magnets 86 and 94 are thus energized, the brake valve rotary valve 11 is turned back to the running position as shown in the drawing, in which the brake pipe 33 and equalizing reservoir 148 are recharged in the same manner as hereinbefore described.

In running position of the brake valve, the reduction limiting valve device 6 operates to vent fluid under pressure from the second reduction reservoir through pipe and passage 170, past the unseated valve 65 and through the atmospheric passage 68. The first reduction reservoir 169, being connected to the second reduction reservoir 171 through pipe and passage 168, cavity 167 in the hold back slide valve 49 and passage and pipe 170, is also vented. With magnet 94 energized, fluid under pressure is vented from the lock up reservoir volume 177 and the connected control valve chamber 45, through passage and pipe 180, valve chamber 98, past the unseated valve 95 and through the atmospheric chamber 99, so that the split reduction device will be operative for the next brake application.

It will be noted that the reset switch 74 is operated in lap position of the brake valve device to close a circuit through the application magnet 86, in order to release an automatic brake application. However, said switch cannot be caused to operate until a predetermined time after the automatic brake application is initiated and the brake valve device is moved to lap position on account of the pressure of the fluid in the reset reservoir 176 and reset diaphragm chamber 131 having to be reduced by flow to the atmosphere through the choked connection 175. This is desirable in order to permit the automatic brake application to be fully effected without interference by the engineer.

If upon a change in signal indication, the cab signal light goes out and the operator desires to prevent the brakes from being applied automatically in the manner hereinbefore described, he shifts the acknowledging switch arms 112 and 113 upwardly by the handle 114, so that the arm 112 connects wire 181 to wire 192 leading to the acknowledging relay magnet 108. A circuit is thereby closed through said magnet and the electric battery 122, by way of wire 77 from the positive pole of the battery 122, decoding relay switch arm 102, wire 181, acknowledging switch arm 112, wire 192, acknowledging relay magnet 108, wire 182, decoding relay switch arm 103, and wire 124 leading to the negative pole of the battery. The magnet 108 thus becomes energized and operates to lift the switch arms 109, 110 and 111 upwardly, so as to connect with wires 181, 123 and 125 respectively.

With the acknowledging relay magnet switch arm 109 connecting with wire 181, a second circuit is closed through the acknowledging relay magnet 108 by way of said wire, decoding relay switch arm 102, wire 77, battery 122, wire 124, decoding relay switch arm 103 and wire 182. The acknowledging relay magnet is thereby energized by current flow through a circuit separate from that through the acknowledging switch arm 112, so that the acknowledging switch arms 112 and 113 may then be returned to their original position as shown in the drawing, and the acknowledging relay magnet will remain energized.

With the acknowledging relay magnet energized and the acknowledging switch arms 112 and 113 returned to their normal position, the two terminals of the slow acting magnet 106 are connected to the governor switch arms 119 and 120 by way of wires 127, 128 and 126, acknowledging relay magnet switch arms 111 and 110 and wires 193 and 194.

If, upon the change in signal indication, due to unfavorable track conditions, the train speed is not greater than that permitted under such track conditions, the speed governor switch arms 119 and 120 connect with wires 124 and 77 from the battery 122, so that by acknowledging the change in signal indication and thus energizing the acknowledging relay magnet 108, the circuit is reclosed through the slow acting magnet 106, which operates switch 107 to reclose the circuit through magnet 105, if said latter circuit is opened, so as to maintain the circuit through the application magnet 86 closed and thereby prevent an automatic application of the brakes from being effected in the manner hereinbefore described.

It will be noted that in order to prevent an automatic application of the brakes from being effected, in the manner just described, the engineer must acknowledge the change in signal indication before the circuit is opened through the application magnet 86 by deenergization of the slow acting magnet 105, and the consequent operation of the magnet switch 104. Failure to do so permits the application magnet to operate switch 93 through which the circuit is closed to said magnet, so that reenergization of slow acting magnet 105 cannot then maintain said application magnet energized.

In order to provide the necessary time period during which the engineer may acknowledge the change in signal indication and thus prevent an automatic application of the brakes from being effected, a lag or delay is provided between the opening of the circuit through the slow acting magnets 106 and 105 and the deenergization of said magnets. This time interval during which the engineer may acknowledge is, therefore, equal to the sum of the lag in magnets 106 and 105 and may be varied by increasing or decreasing the number of such magnets.

If at the time the signal indication changes from favorable to unfavorable, the train speed is in excess of that permitted under the unfavorable track conditions, then the governor switch arms 119 and 120 are raised away from the wires 77 and 124 from the battery 122, so that acknowledging the change in signal indication with consequent energization of the acknowledging relay magnet 108, cannot cause a circuit to be closed through the slow acting magnet 106, as hereinbefore described, so as to prevent a brake application from being automatically effected.

Under such a condition, when the governor switch arms 119 and 120 are not connected with the wires 77 and 124, if the engineer desires to prevent the application from being effected automatically, he operates the brake valve handle 12 to turn the rotary valve 11 to service position in which the brakes are applied through the operation of the brake valve device, and the operation of the automatic apparatus is suppressed in the following manner.

In service position of the brake valve device, the repeater slide valve chamber 21 and the cut-off valve piston chamber 36 are vented to the atmosphere through pipe and passage 143, a cavity (not shown) in the rotary valve 11 and the atmospheric passage 190. The repeater valve piston chamber 22 being connected to the cut-off valve piston chamber 36 through passage and pipe 139, past the ball check valve 140, through magnet valve chamber 91, past the magnet valve 88, the magnet 86 being energized, and from thence through chamber 89 and passage 141, fluid under pressure is also quickly vented therefrom.

With the repeater valve pistons 15 and 16 thus subject to atmospheric pressure, the spring 27 shifts said pistons and slide valve 18 to their intermediate or service position to correspond to the position of the brake valve device, in which position a stop on piston 15 engages the member 24.

With the repeater slide valve 18 in service position, fluid under pressure is permitted to flow from the brake pipe 33 to the suppression diaphragm switch chamber 156 through cavity 158 in said slide valve and passage and pipe 157. The pressure in chamber 156 causes the diaphragm 78 to deflect upwardly against the pressure of spring 80, thereby causing the switch arm 83 to operate and connect wire 124 from the negative pole of battery 122 to wire 130 leading to the application magnet 86. The positive pole of said battery is connected through wire 77 to the other terminal of the application magnet by way of the application magnet switch 93 and wire 76, so that if the operator initiates the brake application prior to deenergization of said application magnet, said application magnet is maintained energized by way of a circuit independent of the normal circuit controlled by the slow acting magnet 105.

In service position of the automatic brake valve device 1, fluid under pressure is vented from the equalizing piston chamber 142 and the equalizing reservoir 148 through passage 145, the choke plug 183, and the vented passage 143. The equalizing reservoir pressure in equalizing piston chamber 142 is thus reduced, which permits the fluid at brake pipe pressure in the equalizing piston chamber 146 to shift the equalizing piston 13 upwardly, thereby opening the brake pipe discharge valve 14, so as to permit fluid under pressure to be vented from the brake pipe 33 and cause an application of the brakes to be effected in the usual well known manner.

Fluid under pressure vented from the brake pipe, by way of the unseated discharge valve 14, flows into passage and pipe 147, which is connected with the atmosphere through the choked opening 163, and flows from said pipe 147 past a ball check valve 195, through pipe 152 and choke plug 153 in the reduction insuring valve device 5.

With the repeater valve device in service position, passage 162 is lapped by the slide valve 18, so that the reduction insuring valve diaphragm chamber 52 and suppression reservoir 160 are bottled up. Since the diaphragm chamber 53 is charged with fluid at brake pipe pressure, spring 55 maintains the diaphragm 51 and follower 54 in the position shown in the drawing and spring 62 seats the double beat valve 58 in its right hand position, in which fluid under pressure vented from the brake pipe is permitted to flow from the valve chamber 154 to chamber 61 and from thence through passage 155 to the atmosphere.

Fluid under pressure vented from the brake pipe past the discharge valve 14 thus flows to the atmosphere at a rate governed by the combined flow capacity of the choked opening 163 and the choke plug 153 in the reduction insuring valve device and also flows from pipe 152 through a choked passage 196 to a timing reservoir 150 and from said pipe through the choked connection 197 to the suppression diaphragm chamber 156 by way of pipe 157.

After the equalizing reservoir pressure is reduced a degree sufficient to cause a brake application that will reduce the train speed to that permitted in the unfavorable territory, the brake valve handle is operated to turn the rotary valve 11 to lap position, in which the connection from the equalizing reservoir to the atmosphere is closed. Fluid under pressure from the equalizing reservoir then continues to flow to the cut-off valve piston chamber 36 and repeater valve chamber 21 and equalizes therein. The build up of pressure in said repeater valve chamber acts on the differential pistons 15 and 16, and piston 15 having the larger area is caused to shift the slide valve 18 to the extreme left, or lap position, to correspond to the position of the brake valve device, in which position communication is cut off between the brake pipe 33 and the suppression pipe 157. Fluid under pressure then continues to flow from the brake pipe, past the discharge valve 14 and to the atmosphere, in order to effect a brake pipe reduction equal in degree to the reduction in equalizing reservoir pressure, and thereby maintain the pressure in the suppression diaphragm chamber 156, so as to hold the switch arm 83 in engagement with the wire 124, thus preventing the application magnet from becoming deenergized.

It will be noted that the suppression switch 83 is initially caused to operate through the operation of the repeater valve device 2 to service position, but upon movement of the brake valve and repeater valve devices to lap position, the connection to the suppression switch diaphragm chamber 156 is cut off. However, the suppression switch 83 is still prevented from opening the application magnet circuit due to the pressure of fluid supplied to said diaphragm chamber by the brake pipe discharge through pipe 147, past the ball check valve 195, through pipe 152, choked connection 197 and pipe 157.

When the brake pipe pressure is reduced to a degree substantially equal to or slightly less than the pressure in the equalizing reservoir, the equalizing piston 13 seats the discharge valve 14 in the usual manner, in order to prevent further brake pipe reduction and to cut off the supply of fluid under pressure to the suppression switch diaphragm chamber 156. The fluid under pressure in said diaphragm chamber and in the timing reservoir 150 then gradually flows to the atmosphere through choke plug 153 in the reduction insuring valve device. When the pressure in said diaphragm chamber is thus reduced to a predetermined degree, spring 80 operates to pull switch arm 83 away from wire 124.

If the brake pipe reduction made is sufficient to apply the brakes, so that the train speed is reduced to that permissible under the unfavorable track conditions, the governor operates to permit the switch arms 119 and 120 to connect to wires 124 and 77. Acknowledging the change in signal indication, in the manner hereinbefore described, then closes the circuit through the slow acting magnet 106 by way of the acknowledging relay switch arms 110 and 111, so that opening of the suppression circuit through the application magnet by operation of the suppression switch arm 83, will have no effect.

In effecting a brake application as just described, the operator must get the train speed reduced to or below a predetermined limit before the pressure in the suppression diaphragm chamber 156 and the timing reservoir 150 becomes reduced sufficient to permit switch arm 83 to operate. Otherwise, with the governor switch arms 119 and 120 in their open position, when said switch arm 83 operates to open the circuit through the application magnet 86, said magnet becomes deenergized and causes an automatic brake application to be effected in the same manner as hereinbefore described.

It will be noted that the operator must initiate a brake application, so as to cause the suppression switch arm 83 to operate and close a circuit through the application magnet 86 prior to deenergization of said magnet and consequent movement of the magnet switch 93, since if said switch, which governs the suppression circuit through said magnet, is opened, an automatic application of the brakes cannot be stopped.

If the train speed is such as to require a full service application of the brakes in order to reduce the speed to that required, the engineer cannot effect a reduction of less than that amount and obtain suppression of an automatic application as hereinbefore described on account of the governor not permitting the switch arms 119 and 120 to connect to wires 124 and 77. However, if he effects a full service reduction in brake pipe pressure, then when the brake pipe reduction is completed, the pressure of the fluid bottled up and effective in the reduction insuring valve diaphragm chamber 52, which pressure is equal to the normal pressure carried in the brake pipe, deflects the diaphragm 51 to the left against the reduced brake pipe pressure in the diaphragm chamber 53 and the resistance of spring 55 and thereby seats the double beat valve 58 in its left-hand position, so as to open communication from the brake pipe to the suppression switch diaphragm chamber 156, through the diaphragm chamber 53, past the double beat valve 58 to chamber 154 and from thence through the choke plug 153, passage and pipe 152, choked connection 197 and pipe and passage 157. The brake pipe pressure is thereby permitted to act on the suppression diaphragm 78 and maintain the suppression switch arm 83 in engagement with wire 124, thus giving permanent suppression of an automatic brake application.

During permanent suppression, the ball check valve 195 prevents the venting of fluid under pressure from the brake pipe to the atmosphere from pipe 152 and through pipe 147 and the choked atmospheric opening 163. This is desirable in order to prevent a further brake pipe reduction, which could not apply the brakes with any greater degree of force than the full service reduction and would, therefore, be an unnecessary waste of compressed fluid.

After acknowledging a change in signal indication and reducing the train speed to or below that permitted by the governor under unfavorable track conditions, if the operator increases the train speed above that permitted, the operation of the governor causes the switch arms 120 and 119 to be raised away from the wires 77 and 124, thereby opening the circuit through the slow acting magnet 106, which circuit was hereinbefore described. The magnet 106 then becomes deenergized and operates to cause an automatic application of the brakes. It is thus evident that the engineer must control the train in accordance with the signal indication as well as in accordance with the train or governor speed.

Under some conditions, the engineer might desire to graduate the brakes on and in so doing would alternately move the brake valve between service and lap positions. In service position, fluid under pressure is supplied to the suppression switch chamber 156 and to the timing reservoir 150 from the brake pipe 33 through cavity 158 in the repeater slide valve and passage and pipe 157 as well as from the brake pipe discharge through pipe 147 and past ball check valve 195. However, with the brake valve and repeater valve in lap position, and the brake pipe discharge valve 14 closed, as after the brake pipe reduction is completed, the supply of fluid under pressure to said switch chamber 156 and reservoir 150 is cut off and the pressure of the fluid therein gradually reduces by flow to the atmosphere through choke 153 in the reduction insuring valve device. The gradual reduction in pressure thereby effected in the timing reservoir 150 and suppression switch chamber 156 maintains the suppression circuit closed through the switch arm 83 and wire 124 only for a predetermined period of time, during which time the engineer must initiate a continuance of the brake pipe reduction. Failure to do so will permit spring 80 to deflect the diaphragm 78 downwardly and pull switch arm 83 away from wire 124, thereby opening the circuit through the application magnet 86 and causing an automatic application of the brakes to be effected in the manner hereinbefore described.

In graduating a brake application when the brake valve device is moved from service to lap position, the repeater valve follows the movement of the brake valve device due to the build up of equalizing reservoir pressure in the slide valve chamber 21. If there should be sufficient leakage past the piston 15 or past the ball check valve 140 into said piston chamber to build up a pressure and cause the repeater pistons 15 and 16 and slide valve 18 to move back to service position, then the suppression switch chamber 156 would be connected to the brake pipe 33 through cavity 158 in said slide valve, and the suppression of an automatic application would be obtained without the engineer having to effect the degree of service application required. In order to prevent such undesired suppression, a volume reservoir 200 is connected to said piston chamber in order to retard the build up of pressure on piston 15, so as to eliminate the possibility of such undesired suppression.

Upon a change in signal indication from unfavorable to favorable, the decoding relay magnet 100 is again energized, thereby causing the acknowledging relay magnet 108 to become deenergized, so as to close the circuit through the slow acting magnet 106, which then operates to reclose the circuit through the application magnet 86 in the normal manner hereinbefore described. The train speed may then be increased, since operation of the governor switch arms 119 and 120 cannot open the circuit through the application magnet when closed in the normal manner.

While one illustrative embodiment of the invention has been described in detail, it is not my intention to limit its scope to that embodiment or otherwise than by the terms of the appended claims.

Having now described my invention, what I claim as new and desire to secure by Letters Patent, is:

1. In a train control apparatus, the combination with electrical means operative upon a change in signal indication for effecting an application of the brakes, of pressure sensitive means operative to suppress the operation of said electrical means.

2. In a train control apparatus, the combination with electrical means operative upon a change in signal indication for causing a brake application to be effected, of electropneumatic means operative to suppress the operation of said electrical means.

3. In a train control apparatus, the combination with electrical means operative upon a change in signal indication for causing a brake application to be effected, of electropneumatic means operative to prevent said electrical means from causing a brake application to be effected.

4. In a train control apparatus, the combination with a magnet operative upon deenergization, caused by a change in signal indication, to effect an application of the brakes, of a switch operative to prevent deenergization of said magnet after said change in signal indication, and a brake valve device operative to cause said switch to operate.

5. In a train control apparatus, the combination with a magnet operative upon deenergization, caused by a change in signal indication, to effect an application of the brakes, of a pressure sensitive switch device operative to a position to prevent deenergization of said magnet, and a brake valve device operative in service position to cause said switch to be operated.

6. In a train control apparatus, the combination with a magnet operative upon deenergization, caused by a change in signal indication, to effect an application of the brakes, of a pressure sensitive switch device operative to a position to suppress the effect of said change in signal indication upon said magnet and a brake valve device for causing said switch to operate.

7. In a train control apparatus, the combination with a magnet operative upon deenergization, caused by a change in signal indication, to effect an application of the brakes, of a switch operative within a predetermined time period after a change in signal indication to prevent deenergization of said magnet, and a brake valve device operative to cause said switch to operate.

8. In a train control apparatus, the combination with a magnet operative upon deenergization, caused by a change in signal indication, to effect an application of the brakes, of a switch operative to prevent deenergization of said magnet and a brake valve device and another valve device, each operative to cause said switch to be operated.

9. In a train control apparatus, the combination with a magnet operative upon deenergization, cause by a change in signal indication, to effect an application of the brakes, of a switch operative to prevent deenergization of said magnet and a brake valve device and another valve device operative to cause said switch to be operated, said brake valve device at one time controlling the operation of said switch independently of said valve device.

10. In a train control apparatus, the combination with a magnet operative upon deenergization, caused by a change in signal indication, to effect an application of the brakes, of a switch operative to prevent deenergization of said magnet and a brake valve device and another valve device operative to cause said switch to be operated, said brake valve device at one time controlling the operation of said switch independently of said valve device and at another time operating with said valve device for controlling said switch.

11. In a train control apparatus, the combination with a magnet operative upon deenergization, caused by a change in signal indication, to effect an application of the brakes, of a switch device operative to prevent deenergization of said magnet, a valve device operative to cause said switch device to be operated and a brake valve device operative in service position to cause said valve device to operate.

12. In a train control apparatus, the combination with a magnet operative upon deenergization, caused by a change in signal indication, to effect an application of the brakes, of a switch device operative to prevent deenergization of said magnet, a valve device operative to supply fluid under pressure to operate said switch device, and a brake valve device operative to control the operation of said valve device and also to supply fluid under pressure to operate said switch device.

13. In a train control apparatus, the combination with a magnet operative upon deenergization, caused by a change in signal indication, to effect an application of the brakes, of a switch for controlling a circuit through said magnet, a brake valve device and another valve device operative to cause said switch to close said circuit for suppressing the effect of said change in signal indication upon said magnet, said valve device being operative upon movement to running position to control the opening of said circuit.

14. In a train control apparatus, the combination with a magnet device operative to effect an application of the brakes, of another magnet device operative upon a change in signal indication to control the operation of the first mentioned magnet device, means controlled in accordance with the speed of the train for rendering the first mentioned magnet device operative or inoperative to effect an application of the brakes.

15. In a train control apparatus, the combination with a magnet device operative to effect an application of the brakes, of another magnet device operative upon a change in signal indication to control the operation of the first mentioned magnet device, means controlled manually for suppressing the operation of the first mentioned magnet device and controlled in accordance with the speed of the train for preventing suppresssion of the operation of the first mentioned magnet device.

16. In a train control apparatus, the combination with a magnet device operative to effect an application of the brakes, of another magnet device operative upon a change in signal indication to control the operation of the first mentioned magnet device, means controlled manually for preventing the first mentioned magnet device from operating dependent upon the speed of the train.

17. In a train control apparatus, the combination with a plurality of successively operated magnets for controlling the brakes in accordance with the signal indication, of a manually operative switch for acknowledging a change in signal indication, a speed governor for closing a circuit through said acknowledging switch and one of said magnets to prevent deenergization of the last mentioned magnet when the train speed is below a predetermined limit and to open said circuit when the train speed is above a predetermined limit.

18. In a train control apparatus, the combination with a magnet valve device operative to control the brakes, of a magnet switch device operative in accordance with the signal indication, a slow acting magnet switch device controlled by said magnet switch device and operative to control said magnet valve device, an acknowledging relay magnet switch, an acknowledging switch operative to control said acknowledging relay magnet switch upon deenergization of the magnet of said magnet switch device, and a speed governor cooperating with said acknowledging relay magnet switch for controlling a circuit through said slow acting magnet.

19. In a train control apparatus, the combination with a brake pipe, of a discharge valve, electrical means operative to cause said discharge valve to open for venting fluid under pressure from said brake pipe, manually operative means for also causing said discharge valve to open, said discharge valve being so controlled by fluid under pressure as to close when a certain brake pipe reduction is effected, means operative when said discharge valve is operated by the operation of said manually operative means for preventing the operation of said electrical means and for maintaining said electrical means inoperative for a predetermined period of time after said discharge valve closes.

20. In a train control apparatus, the combination with a brake pipe, of a discharge valve, electrical means operative to cause said discharge valve to open for venting fluid under pressure from said brake pipe, manually operative means for also causing said discharge valve to open, said discharge valve being so controlled by fluid under pressure as to close when a certain brake pipe reduction is effected, means operative by fluid under pressure vented from said brake pipe upon the opening of said discharge valve by the operation of said manually operative means for preventing the operation of said electrical means, a reservoir, a check valve for permitting said reservoir to become charged by fluid under pressure vented from said brake pipe, the fluid under pressure from said reservoir being effective upon said means, after closure of said discharge valve, to prevent the operation of said electrical means.

21. In a train control apparatus, the combination with a brake pipe, of a discharge valve, a magnet valve device operative upon a change in signal indication to cause said discharge valve to open for venting fluid under pressure from said brake pipe, a brake valve device also operative to cause said discharge valve to open, a switch, a diaphragm operative by fluid under pressure vented from said brake pipe for causing said switch to close a circuit through said magnet valve device to prevent the operation thereof when said discharge valve is opened by the operation of said brake valve device.

22. In a train control apparatus, the combination with a brake pipe, of a discharge valve, a magnet valve device operative upon a change in signal indication to cause said discharge valve to open for venting fluid under pressure from said brake pipe, a brake valve device also operative to cause said discharge valve to open, pneumatic means operative to prevent the operation of said magnet valve device, a reservoir normally at atmospheric pressure and charged with fluid under pressure vented from said brake pipe by the opening of said discharge valve, the fluid under pressure being effective to operate said pneumatic means for preventing the operation of said magnet valve device while said discharge valve is open and for a predetermined period of time after said discharge valve closes.

23. In a train control apparatus, the combination with a brake pipe, of a discharge valve, a magnet valve device operative upon a change in signal indication to cause said discharge valve to open for venting fluid under pressure from said brake pipe, a brake valve device also operative to cause said discharge valve to open, a reservoir charged by fluid under pressure vented from said brake pipe, a switch pneumatically operated in service position of said brake valve device to close a circuit through said magnet valve device to prevent the operation thereof upon a change in signal indication, the fluid under pressure from said reservoir being vented to the atmosphere at such a rate as to cause said switch to maintain said circuit closed for a predetermined period of time after said discharge valve closes.

24. In a train control apparatus, the combination with a magnet valve device operative to cause an automatic application of the brakes, of electro-pneumatic means operative after the brake application is effected to cause said magnet valve device to operate to control the release of the brakes.

25. In a train control apparatus, the combination with a magnet valve device operative upon a change in signal indication to cause an application of the brakes, of a switch for controlling a circuit through said magnet valve device, a brake valve device, pneumatic means operative in lap position of said brake valve edvice to close said circuit through said switch to permit said application of the brakes to be released.

26. In a train control apparatus, the combination with a magnet valve device operative upon energization to effect a release of the brakes, and operative upon deenergization to cause an application of the brakes, a switch for closing a circuit through the magnet of said magnet valve device to energize it, said switch comprising a follower, a diaphragm at one side of said follower, a spring at the other side of said follower, said spring and follower being adapted to control the operation of said switch, a reservoir communicating with one side of diaphragm, a brake valve device operative in running position to supply fluid under pressure to said reservoir through a restricted passage to cause said diaphragm and follower to operate said switch to open said circuit, said brake valve device being operative in lap position to vent fluid under pressure from said reservoir through said restricted passage to cause said spring to operate said switch and close said circuit to effect a release of the brakes.

27. In a train control apparatus, the combination with a magnet valve device operative to cause an automatic application of the brakes, of electro-pneumatic means operative to control the operation of said magnet valve device for governing the release of the brakes, and means cooperating with said electro-pneumatic means and adapted to time operation of said electro-pneumatic means.

28. In a fluid pressure brake, the combination with a brake valve device, of a valve device supplemental to and operative with said brake valve device for controlling the brakes, said valve device having positions corresponding to positions of said brake valve device.

29. In a fluid pressure brake, the combination with a brake valve device, of a valve device associated with said brake valve device and operative therewith to control the brakes, said valve device having operative positions corresponding to positions of the brake valve device.

30. In a fluid pressure brake, the combination with a pilot valve device, of a relay valve device operative by the operation of said pilot valve device for controlling the brakes, both of said valve devices having corresponding operative positions.

31. In a fluid pressure brake, the combination with a brake valve device, of a valve device supplemental to and operatively controlled by said brake valve device, said valve device comprising a valve and a plurality of pistons for operating said valve.

32. In a fluid pressure brake, the combination with a brake valve device, of a valve device supplemental to and operatively controlled by said brake valve device, said valve device comprising a valve and differential pistons for operating said valve.

33. In a fluid pressure brake, the combination with a brake valve device, of a valve device supplemental to and operatively controlled by said brake valve device, said valve device comprising a valve and two pistons of different diameters for operating said valve.

34. In a fluid pressure brake, the combination with a brake valve device having the usual running, service and lap positions, of a repeater valve device controlled by the operation of said brake valve device and having positions corresponding to the positions of said brake valve device, said brake valve device being adapted to establish communication through which fluid under pressure is supplied to said repeater valve device for causing it to be moved to a position corresponding to the position of said brake valve device.

35. In a fluid pressure brake, the combination with a brake valve device having a plurality of brake controlling positions, of a valve device having positions corresponding to the positions of said brake valve device and being operative upon the operation of said brake valve device to move to a position corresponding to the position of said brake valve device to control the brakes.

36. In a train control apparatus, the combination with a brake pipe, of a reservoir normally at atmospheric pressure, valve means operative to effect a brake pipe reduction in two stages, said valve means being adapted to supply fluid under pressure to said reservoir during the initial stage of brake pipe reduction, the pressure of fluid from said reservoir being adapted to lock said valve means in the operating position while effecting a second stage of reduction in brake pipe pressure.

37. In a train control apparatus, the combination with a brake pipe, of a reservoir normally having communication with the atmosphere, electrical means operative for closing said communication, a valve device operative upon a change in signal indication to effect a brake pipe reduction in successive stages, said valve device comprising a control portion operative during the initial stage of brake pipe reduction to supply fluid under pressure to said reservoir, the fluid under pressure from said reservoir being adapted to lock said control portion in its operative position during the second stage of reduction in brake pipe pressure.

38. In a train control apparatus, the combination with a brake pipe, of means operative to effect successive reductions in brake pipe pressure, a reservoir normally vented to the atmosphere, a magnet valve device operative upon a change in signal indication to initiate the operation of said means and to close the communication of said reservoir with the atmosphere, said means having a first reduction position in which said reservoir is charged with fluid under pressure for locking said means in a second reduction position after the first reduction is completed.

39. In a train control apparatus, the combination with a brake pipe, of means operative to effect successive reductions in brake pipe pressure, a reservoir normally vented to the atmosphere, a magnet valve device operative upon a change in signal indication to initiate the operation of said means and to close the communication of said reservoir with the atmosphere, said means in its first reduction position charging said reservoir with fluid under pressure to lock said means after said first reduction is completed.

40. In a train control apparatus, the combination with a brake pipe, of a valve device operative to effect a reduction in brake pipe pressure in two stages, a magnet operative in accordance with the track conditions for controlling the operation of said valve device, a reservoir, another magnet operative in parallel with the first mentioned magnet to control an atmospheric connection from said reservoir, said valve device comprising a control portion operative by fluid vented from said brake pipe during the first stage of reduction in brake pipe pressure to cause said reservoir to be charged with fluid under pressure for holding said control portion in a second reduction position after the first stage of brake pipe reduction is completed.

41. In a train control apparatus, the combination with a brake pipe and a reservoir, of a two stage reduction valve device operative to effect a discharge of fluid under pressure from said brake pipe to said reservoir, and a magnet valve device operative in accordance with a signal indication for controlling an atmospheric connection from said reservoir.

42. In a train control apparatus, the combination with a brake pipe and a reservoir, of a two stage reduction valve device operative to effect a discharge of fluid under pressure from said brake pipe to said reservoir, and a magnet valve device operative upon energization to connect said reservoir to the atmosphere and operative upon deenergization to disconnect said reservoir from the atmosphere.

43. In a train control apparatus, the combination with a brake pipe and a reservoir, of a two stage reduction valve device operative to effect a discharge of fluid under pressure from said brake pipe to said reservoir, and a magnet valve device operative under favorable trackway conditions to connect said reservoir to the atmosphere.

44. In a train control apparatus, the combination with a brake pipe, of a valve device operative in one position to effect an initial brake pipe reduction, and operative in another positon to effect a second brake pipe reduction, and electrically controlled means operative after said initial reduction is completed to maintain said valve device in the second reduction position.

45. In a train control apparatus, the combination with a brake pipe, of a valve device having a first and a second reduction position, and electro-pneumatic means operative upon a change in signal indication for maintaining said valve device in its second reduction position after said first reduction is completed.

46. In a train control apparatus, the combination with a brake pipe, of electrical means operative upon a change in signal indication to effect a reduction in brake pipe pressure, of manually operative means operative to effect a reduction in brake pipe pressure, and pressure sensitive means operative after a predetermined reduction in brake pipe pressure is effected by the operation of said manually operative means for suppressing the operation of said electrical means upon a change in signal indication.

47. In a train control apparatus, the combination with a brake pipe, of electrical means operative upon a change in signal indication to effect a reduction in brake pipe pressure, of manually operative means operative to effect a reduction in brake pipe pressure, and pressure sensitive means operative after a predetermined reduction in brake pipe pressure is effected by the operation of said manually operative means for permanently suppressing the operation of said electrical means upon a change in signal indication.

48. In a train control apparatus, the combination with a brake pipe, of electrical means operative upon a change in signal indication to effect a reduction in brake pipe pressure, of manually operative means operative to effect a reduction in brake pipe pressure, and pressure sensitive means operative by fluid under pressure from said brake pipe after a predetermined reduction in brake pipe pressure is effected by the operation of said manually operative means for permanently suppressing the operation of said electrical means upon a change in signal indication.

49. In a train control apparatus, the combination with a brake pipe, of electrical means operative upon a change in signal indication to effect a reduction in brake pipe pressure, of electro-pneumatic means operative to prevent the operation of said electrical means, a brake valve device operative in service position to cause said electro-pneumatic means to operate, and valve means automatically operative upon a predetermined reduction in brake pipe pressure effected by the operation of said brake valve device for causing said electro-pneumatic means to operate.

50. In a train control apparatus, the combination with a brake pipe, an equalizing reservoir, and valve means operated upon a reduction in pressure in the equalizing reservoir for venting fluid from the brake pipe, of a chamber normally at atmospheric pressure, a magnet controlled according to the signal indication, and a valve operated by said magnet for connecting said chamber to said reservoir.

In testimony whereof I have hereunto set my hand.

THOMAS H. THOMAS.

DISCLAIMER 1,765,509.—*Thomas H. Thomas*, Edgewood, Pa. AUTOMATIC TRAIN-CONTROL EQUIPMENT. Patent dated June 24, 1930. Disclaimer filed July 8, 1933, by the assignee, *The Westinghouse Air Brake Company*, the executrix of said Thomas H. Thomas, deceased, Mabel M. Thomas, concurring and assenting.

Hereby enters this disclaimer to that claim which is in the following words:

"27. In a train control apparatus, the combination with a magnet valve device operative to cause an automatic application of the brakes, of electro-pneumatic means operative to control the operation of said magnet valve device for governing the release of the brakes, and means cooperating with said electro-pneumatic means and adapted to time operation of said electro-pneumatic means "

[*Official Gazette August 1, 1933*]